United States Patent [19]

Smolik

[11] Patent Number: 5,321,924
[45] Date of Patent: Jun. 21, 1994

[54] WALL ASSEMBLY

[76] Inventor: Robert A. Smolik, 670 W. 7th St., St. Paul, Minn. 55102

[21] Appl. No.: 49,775

[22] Filed: Apr. 19, 1993

Related U.S. Application Data

[62] Division of Ser. No. 761,713, Sep. 17, 1991, Pat. No. 5,203,132.

[51] Int. Cl.⁵ .............................................. E04H 1/00
[52] U.S. Cl. ................................... 52/204.1; 52/241; 52/204.2; 52/205; 52/213
[58] Field of Search ............... 52/20, 241, 243, 204.1, 52/204.2, 205, 210, 213

[56] References Cited

U.S. PATENT DOCUMENTS

| | | | |
|---|---|---|---|
| 3,072,226 | 1/1963 | Harwood | 52/241 |
| 3,160,280 | 12/1964 | Burch | 52/241 |
| 3,514,912 | 6/1970 | Smith | 52/205 |
| 3,609,928 | 10/1971 | Mock | 52/210 |
| 3,821,868 | 7/1974 | Edwards | 52/241 |
| 3,886,688 | 6/1975 | Ragland | 52/213 |
| 3,999,343 | 12/1976 | Roberts | 52/241 |
| 4,068,432 | 1/1978 | Davis | 52/241 |
| 4,228,630 | 10/1980 | Englert et al. | 52/204.1 |
| 4,281,480 | 12/1981 | Wendt | 52/213 |
| 4,330,972 | 5/1982 | Sailor | 52/213 |
| 4,805,364 | 2/1989 | Smolik | 52/241 |
| 4,825,610 | 5/1989 | Gasteiger | 52/243 |
| 4,870,793 | 10/1989 | Tomlinson | 52/241 |
| 4,910,934 | 3/1990 | Hennings | 52/241 |
| 4,914,880 | 4/1990 | Albertini | 52/241 |

*Primary Examiner*—Carl D. Friedman
*Assistant Examiner*—Wynn E. Wood
*Attorney, Agent, or Firm*—James W. Miller

[57] ABSTRACT

A wall assembly includes a wall frame which is made from a U-shaped support channel in which one end of a wall stud may be releasably engaged by a ratchet engagement formed between the channel and the stud. The ratchet engagement is defined by ratchet teeth provided on the side walls of the channel and splines provided on the sides of the wall stud which splines are shaped to releasably engage the grooves between adjacent teeth. In addition, a door unit is used in the wall assembly which includes a peripheral pocket around the side jambs and top header of the door unit to allow the wallboard to be inserted into this pocket. Fasteners can then be used to secure the wallboard to the flange which defines the peripheral pocket such that the wallboard is connected directly to the door unit, thus obviating the need for side studs secured to the side jambs of the door unit.

10 Claims, 2 Drawing Sheets

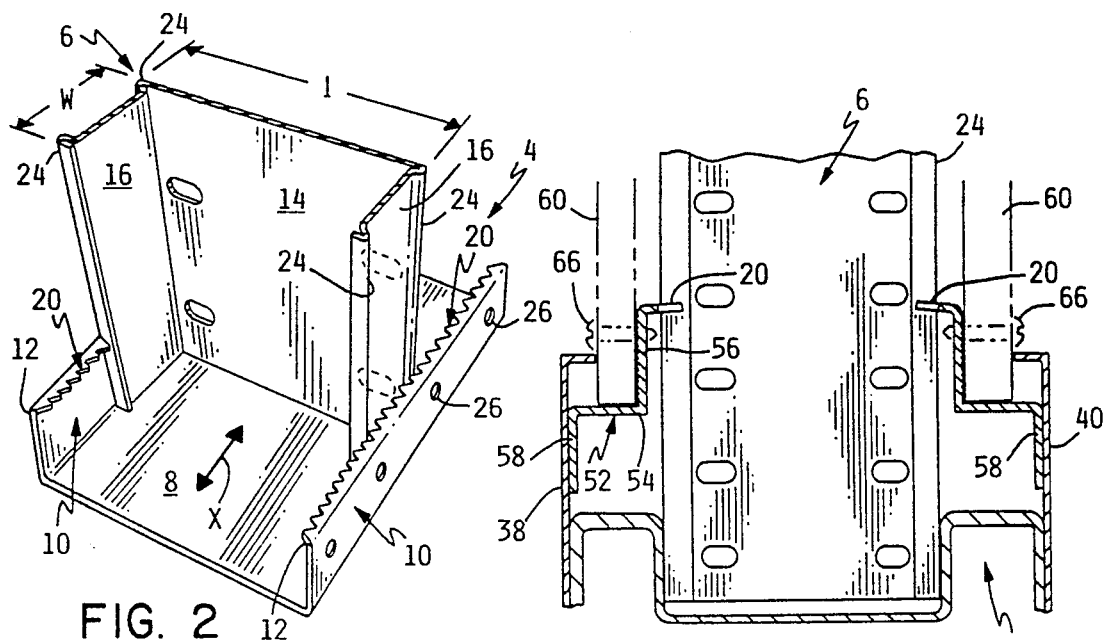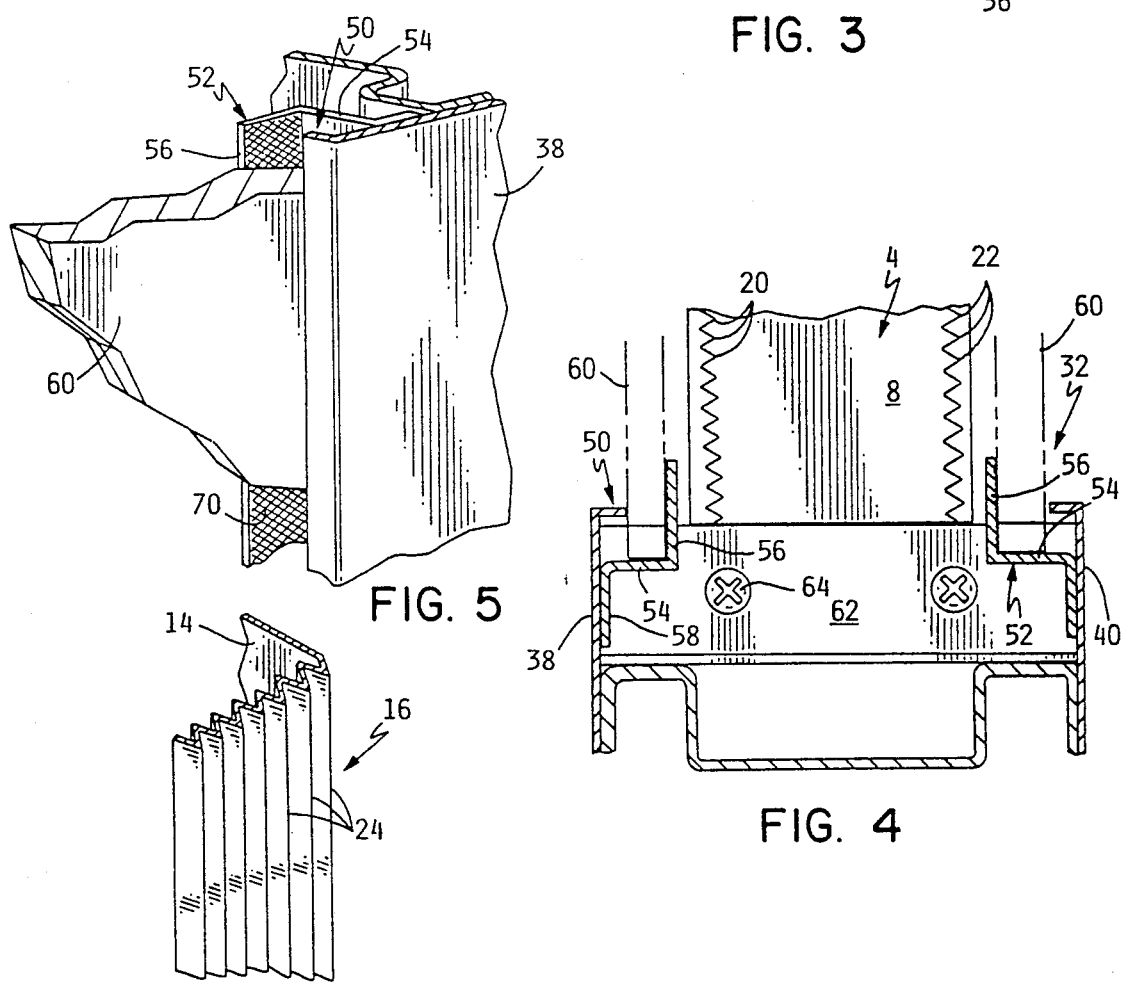

WALL ASSEMBLY

This application is a division of application Ser. No. 07/761,713, filed Sep. 17, 1991, now U.S. Pat. No. 5,203,132.

TECHNICAL FIELD

The present invention relates to a wall assembly having an improved support channel and wall stud that may be used in constructing the frame of the wall assembly, and to an improved door unit that may be used to provide a door opening in the wall assembly.

BACKGROUND OF THE INVENTION

In constructing non-load bearing walls, a wall frame is first constructed and wallboard or sheetrock is then secured to the wall frame to complete the wall. In constructing the wall frame, metal building components are often used today instead of the traditional wooden components. These metal components comprise U-shaped support channels fixed to the floor and ceiling o f the building in an aligned relationship. Rectangularly shaped metal wall studs are inserted into the support channels and are securely attached thereto using various conventional fasteners.

A great deal of labor is required in constructing wall frames of this type. In particular, the need to fasten the wall studs to the support channels is time consuming and requires the use of multiple steps and the presence of the appropriate tools and fasteners. The Applicant of the present invention has previously recognized the inconvenience and added expense involved in constructing a wall assembly with these components. To overcome these disadvantages, the Applicant has previously disclosed improved support channels and wall studs which may be secured together without using any fasteners or the time involved in securing such fasteners. U.S. Pat. Nos. 4,805,364 and 4,854,096 are directed to such improved channels and wall studs and building methods using these components.

While the channels and wall studs disclosed in Applicant's prior patents are a vast improvement over the use of traditional metal channels and studs, the Applicant has discovered certain relatively minor disadvantages even for them. For example, while the studs can be easily twisted into the pockets provided for them in the channels as disclosed in the 096 patent, the pockets are spaced only at certain locations along the length of the channels. Thus, the wall studs can be positioned only at the locations provided by the pockets.

In addition, while the studs shown in the 364 patent can be located almost anywhere in the channels, they are secured in the channels by bending down some serrations provided in the channels to form a pocket on either side of the stud after the stud is placed in the channel. Thus, the additional step of bending down the serrations at the job site is required. In addition, if the position of the stud has to be changed for any reason, the serrations have to be bent back upwardly, the stud moved to its new location, and some additional serrations bent down to form a pocket in the new location. Such a procedure does require a number of installational steps.

Finally, in building wall assemblies of the type under consideration here, prefabricated door units are often used. It is the normal practice to provide a side header or side stud adjacent each side jamb of the door unit and to fasten this side stud to the side jamb of the door unit using conventional fasteners. Again, this can become a time consuming operation requiring the use of many additional fasteners and the time required to install all such fasteners. Thus, using such a door unit in the Applicant's improved wall assembly somewhat detracts from the utility of the wall assembly as fastening of the side studs to the door unit is still required.

SUMMARY OF THE INVENTION

It is one aspect of the present invention to provide a wall assembly in which the wall frame is made of an improved support channel and stud, and to the channel and stud themselves.

Accordingly, a wall assembly according to the present invention comprises a framework formed of a plurality of elongated wall studs, wherein each wall stud has a predetermined cross-sectional length extending between two opposed transverse sides of the wall stud. A first support channel is provided for receiving at least one end of each wall stud, the support channel being elongated along a longitudinal axis and being formed from a base wall with two spaced side walls extended perpendicularly from the base wall for forming a U-shaped cross-sectional configuration for the channel having a width between the side walls of the channel corresponding generally to the cross-sectional length of the wall stud. The wall studs are suited to be disposed in perpendicular relationship to the support channel with the one end of each wall stud being received in the channel and extending transversely across the channel. Finally, means are carried on the support channel and the wall studs for forming a ratchet engagement therebetween which ratchet engagement is configured to releasably hold the wall studs in place in the channel but which can be overcome to allow the wall studs to be pushed or bumped into a new location in the channel.

Another aspect of the present invention relates to an improved door unit for use in a wall assembly of the type set forth above or any wall assembly built even with other channel and stud components. This door unit comprises a door frame which includes two, spaced side jambs connected at their top ends by a top header which spans the distance between the side jambs, the side jambs and top header having a generally similar cross-sectional configuration which includes a front panel on a front side of the door frame and a rear panel on a rear side of the door frame. The door unit further includes a peripheral pocket along the length of each of the side jambs and the top header on both the front and rear panels of the door unit, wherein the pocket extends a relatively short distance in back of the front and rear panels on each of the side jambs and the top header. The pocket is dimensioned to receive therein one edge of a piece of wallboard to allow the wallboard to be directly connected to the door unit.

BRIEF DESCRIPTION OF THE DRAWINGS

The present invention will be described in detail hereafter in the Detailed Description, when taken in conjunction with the following drawings, in which like reference numerals refer to like elements throughout.

FIG. 2 is an enlarged perspective view of a portion of the wall assembly shown in FIG. 1, particularly illustrating the ratchet engagement between the improved support channel and improved wall stud of the present invention;

FIG. 3 is a cross-sectional view taken along lines 3—3 of FIG. 1, particularly illustrating the top header portion of the improved door unit of the present invention to show the wallboard receiving peripheral pocket on the front and rear sides of the door unit and the attachment of a short header wall stud to the top header portion of the door unit using the same ratchet engagement as disclosed in FIG. 2 for the support channel and the wall stud;

FIG. 4 is a cross-sectional view taken along lines 4—4 of FIG. 1, particularly illustrating a side jamb of the improved door unit of the present invention to show the wallboard receiving peripheral pocket on the front and rear sides of the side jamb;

FIG. 5 is an enlarged perspective view of a portion of the side jamb of the improved door unit of the present invention, particularly illustrating the peripheral pocket for receiving one edge of a sheet of wallboard; and FIG. 6 is a partial perspective view of the side of an alternative embodiment of a wall stud according to the present invention, particularly illustrating an alternative embodiment for that portion of the ratchet engagement carried on the wall stud.

DETAILED DESCRIPTION

Figure 1:
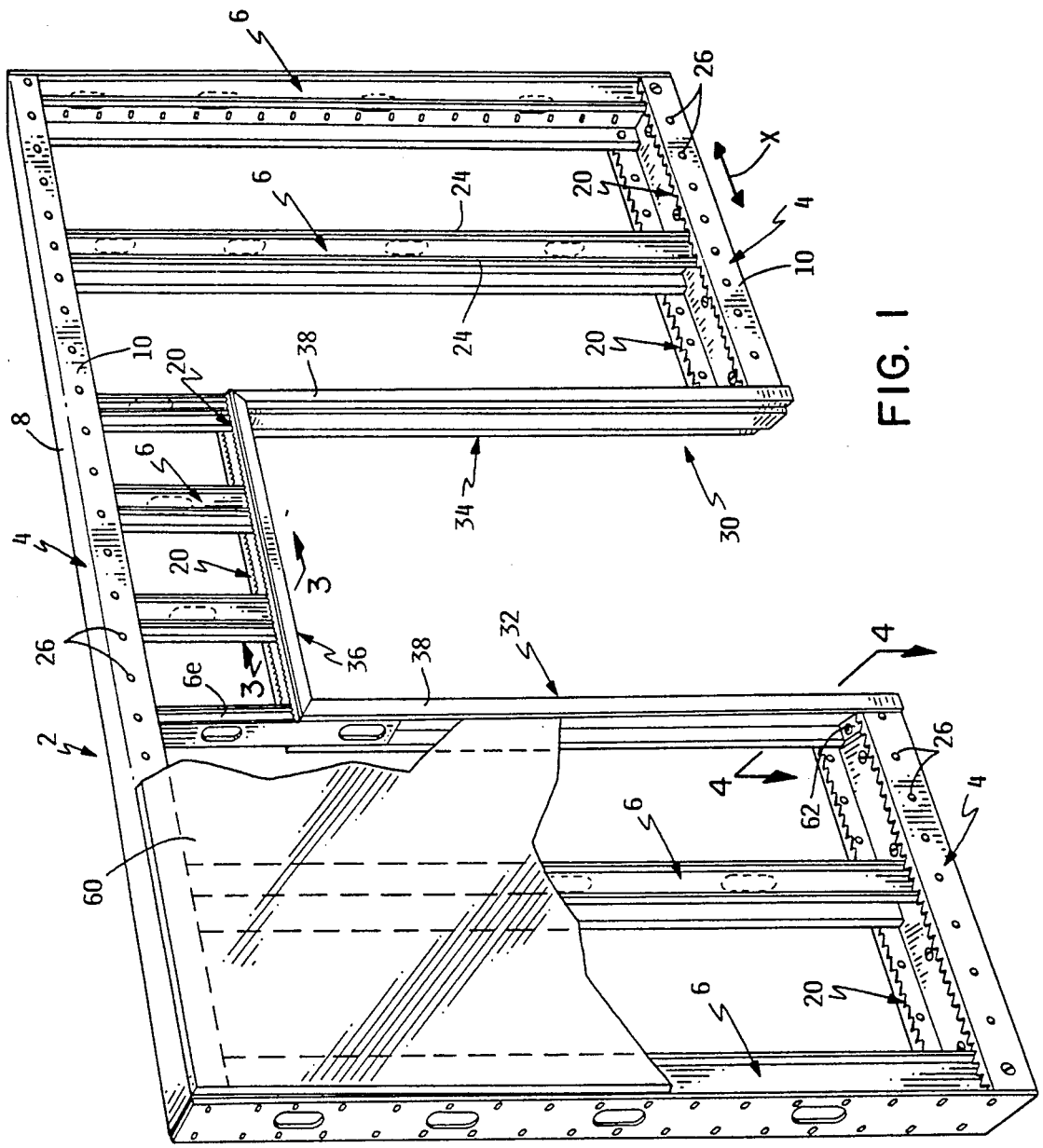
FIG. 1 is a perspective view of an improved wall assembly according to the present invention, particularly illustrating the improved support channel and wall stud used in constructing the framework of the wall assembly and the improved door unit of the present invention.

The present invention relates to an improved wall assembly 2 and to a number of improved building components used for constructing the wall assembly. More particularly, the present invention relates to an improved support channel 4 used as the top and bottom support members of wall assembly 2 and to an improved elongated wall stud 6 which extends vertically between opposed and aligned support channels 4. See FIG. 1. In addition, the present inventor relates to a door unit 30 which may be made part of wall assembly 2 for providing a door opening therein.

The Applicant of the present invention is the patentee and owner of prior U.S. Pat. Nos. 4,805,364 and 4,854,096 issued to a wall assembly having similar support channels and wall studs. These patents are hereby incorporated by reference for teaching the various details of how these components are used in the construction of a wall. Support channel 4 and wall stud 6 disclosed in the present application are improvements over the corresponding components shown in the Applicant's prior patents. Thus, they will be described herein insofar as is necessary for an understanding of the present invention. Again, reference should be had to Applicant's prior patents for a more complete understanding of the previously disclosed support channels and wall studs and how they are used to form a wall.

Support channels 4 and wall studs 6 have a generally similar configuration to that disclosed in Applicant's prior patents incorporated by reference herein. Referring to FIG. 2, support channels 4 are elongated along a longitudinal axis x to extend for some distance and have a U-shaped cross-sectional configuration defined by a base wall 8 having two spaced side walls 10 which extend vertically relative to base wall 8 to form channel 4. Side walls 10 of channel 4 terminate in free ends 12 which are spaced away from base wall 8 by the length of side walls 10. Channels 4 thus have an open cross-sectional configuration into which one end of wall stud 6 is inserted in the typical manner, i.e. with wall stud 6 running transversely across the width of channel 4 and extending vertically out of channel 4.

Wall stud 6 is itself also shaped similarly to the wall studs disclosed in Applicant's prior patents. Namely, wall stud 6 is elongated and has a generally C-shaped or U-shaped cross-sectional configuration. In this case, wall stud 6 includes a base wall 14 having a length l which is slightly less than the width of channel 4 with two side walls 16 extending outwardly from one side of base wall 14 as illustrated in FIG. 2. Side walls 16 form, in effect, two opposed, transverse sides of wall stud 6.

While a relatively open cross-sectional configuration is illustrated herein for wall stud 6, similar to the shape of the wall studs 6 shown in Applicant's prior patents, this is not necessary. Basically, the C-shaped stud 6 shown herein simply defines an overall cross-sectional shape which is basically rectangular having a length l and a width w. Thus, wall studs having an I-shaped cross-sectional configuration, or an H-shaped cross-sectional configuration, could also be used for the purposes of the present invention. In effect, all that is required is that the cross-sectional configuration of stud 6 define a generally rectangular shape for wall stud 6 which rectangular shape is arranged to fit transversely across the width of the longitudinally extending support channels.

The difference between support channels 4 and wall studs 6 shown herein and the corresponding components disclosed in Applicant's prior patents is the structure for engaging or securing the ends of wall studs 6 within channels 4. In the present invention, a first ratchet portion is applied to the interior cross-sectional configuration of channels 4 and a second ratchet portion is applied to the exterior of the cross-sectional configuration of wall stud 6. The first and second ratchet portions cooperate with one another to allow the end of stud 6 to be releasably held within channel 4. Together, the first and second ratchet portions define a ratchet engagement means extending between support channel 4 and wall stud 6 which can be easily made to slip simply by bumping or tapping the end of wall stud 6 to slide the second ratchet portion over the first ratchet portion. This allows stud 6 to be easily and quickly positioned, or repositioned, within channels 4.

As disclosed in FIGS. 1 and 2, the first ratchet portion, i.e. the portion which is provided on support channels 4, comprises an inwardly directed set of ratchet teeth 20 provided in a sawtooth configuration having grooves 22 between adjacent teeth 20 located on the upper edge 12 of each channel side wall. Preferably, ratchet teeth 20 extend continuously over the entire length of support channel 4 to essentially form a very large number of adjustment positions. Ratchet teeth 20 are relatively rigid in relation to side walls 10 of channel 4, that is they are not designed to be easily bent as were the serrations shown in the Applicant's U.S. Pat. No. 4,805,364. Ratchet teeth 20 may be integrally formed or machined into channel 4 when channels 4 are manufactured.

The second ratchet portion comprises at lest one outwardly extending ridge or spline 24 located on each side wall 16 of wall stud 6. As shown in FIG. 2, two such ridges or splines 24 can be used at either end of side walls 16. Splines 24 are designed to be received within the grooves 22 between adjacent ratchet teeth 20. In other words, the spacing between splines 24 on wall stud 6 is generally equal to the groove spacing in the sawtooth shaped ratchet teeth 20.

Ratchet teeth 20 on support channel 4 and the cooperating splines 24 on the exterior of wall stud 6 cooperate in the manner generally known for ratchet mechanisms. Wall stud 6 can have one end dropped down into channels 4 in a slightly twisted or canted orientation. When wall stud 6 is then straightened out, splines 24 will engage in the grooves 22 between ratchet teeth 20 to hold wall stud 6 in place therein. However, the holding force exerted between wall studs 6 and ratchet teeth 20 is not so strong that it cannot be overcome when stud 6 needs to be more precisely positioned or moved within channel 4. This can be done simply by taking one's hand and hitting or bumping wall stud 6 which forces the splines 24 on wall stud 6 to slide over ratchet teeth 20 on channel 4 until they are received within other grooves 22 further down the set of ratchet teeth. One can fairly precisely position wall stud 6 simply by bumping or hitting it in the desired direction until the end of stud 6 is positioned where it should be.

Ratchet teeth 20 are approximately 0.100 to 0.115 inches long and splines 24 are dimensioned to fit within grooves 20 and to be able to slide thereover with a ratcheting action. The exact configuration and dimensions of ratchet teeth 20 and splines 24 can obviously be varied as long as studs 6 can be ratcheted within channels 4. In this regard, channels 4 are somewhat flexible so that the side walls 10 thereof can bend or flex outwardly somewhat to allow splines 24 to ratchet over teeth 20. Once the ratcheting action is completed, side walls 10 will firmly reengage ratchet teeth 20 with splines 24. In addition, the user can simply bend side walls 10 inwardly a bit by hand, if necessary, if side walls 10 have been previously flexed outwardly until ratchet teeth 20 are in a position to engage splines 24.

The improved support channel 4 and wall stud 6 of the present invention has advantages even over Applicant's previously disclosed channels and studs. For one thing, the continuous nature of ratchet teeth 20 along channels 4 allows studs 6 to be placed anywhere within channels 4 that is desired by the user, and not just where retention pockets are located within the channels. In addition, ratchet teeth 20 and the cooperating splines 24 are relatively rigid and provided on the components when they are initially manufactured. Thus, there is no need for further manipulation or bending of the components as is the case for the bendable serrations disclosed in Applicant's U.S. Pat. No. 4,805,364. Accordingly, support channels 4 and wall studs 6 of the present invention are economical to manufacture and extremely economical to install, but yet are extremely versatile in use.

Preferably, the splines 24 provided in side walls 16 of wall stud 6 extend over the entire length of wall stud 6 between the top and bottom ends thereof. Thus, as shown in FIG. 1, the bottom end of wall stud 6 can be secured in place by ratchet teeth 20 provided in the lower support channel 4 and the upper end of wall stud 6 would be secured to ratchet teeth 20 provided in the upper support channel 4. However, it would not strictly be necessary to provide the splines 24 running the full length of wall stud 6. Instead, splines 24 could be provided just on the upper and lower ends of wall stud 6 and extend down the length of stud 6 for just a short distance. However, since many wall studs are cut to length on the job site, this is not preferred and instead it is preferred to use splines 24 that run the whole length of stud 6. In this event, the splines will always be provided at the top and bottom ends of wall stud 6 even if a wall stud is cut to a shorter length than the length to which stud 6 was originally manufactured.

As shown in FIG. 2, two spaced splines 24 can be used on side walls 16 of wall stud 6. However, the number of ridges or splines used thereon can obviously be varied. In some cases, two adjacent sheets of wallboard might meet at the centerline of wall stud 6 with the sheets being secured to the side walls 16 of stud 6 by the usual wallboard fasteners. The Applicant has found that using only two spaced splines 24 as shown in FIG. 2 can cause the edges of the wallboard so secured to bend inwardly somewhat because the edges are not supported by the splines but in effect are cantilevered over the splines. To avoid this, it would be possible to form an entire series of ridges or splines 24 extending across the whole width of stud 6, i.e. across the entire length of each side wall 16 of stud 6, which splines 24 would have an equivalent spacing to the spacing of grooves 22 in the sawtooth configuration of ratchet teeth 20. Thus, if two wallboard panels were to meet in the middle of stud 6, each panel would have the edge thereof supported by a number of splines 24, and the panel edge would not tend to break or bend when fastened to the side of wall stud 6.

Both the support channels 4 and wall studs 6 are preferably manufactured from metal, e.g. steel, using known forming and metalworking techniques. The side walls 10 of channels 4 could be provided with a plurality of holes 26 located therein at regular intervals, e.g. every 4 inches or so. Holes 26 form a scale or indicia which the installer can use to help place wall studs 6 within channels 4 in a pre-determined spacing. For example, if studs 6 are desirably located 16 inches apart and holes 26 are 4 inches apart, then studs 6 would be aligned with every fourth hole 26 provided in channel side wall 10. Obviously, other indicia means could be used in place of the series of holes 26 such as a scale or markings embossed or formed on the side walls 10 of channel 4.

Another aspect of the present invention is the provision of an improved door unit 30 which may be placed into wall assembly 2 formed by the improved support channel 4 and wall stud 6 of the present invention. As will be clear from the following description, door unit 30 is modified to cooperate with the improved wall studs 6 of the present invention. However, use of the door unit 30 is not limited for use with the disclosed wall studs. Instead, the door unit 30 could be used in other types of wall assemblies built from other support channels and/or wall studs.

Door unit 30 is a typical unit of a conventional type having a preformed door frame with left and right door jambs 32 and 34, respectively, and a top header 36. Usually, in certain metal prefabricated door units 30 of this type, door jambs 32 and 34 and door header 36 have a recessed U-shaped cross-sectional configuration which includes front and rear panels 38 and 40 which form, in effect, the front and rear sides of the door frame. This U-shaped cross-sectional configuration extends all the way around the door unit, i.e. all the way around the door jambs and the door header and is continuous except for, of course, changing direction where the door jambs 32 and 34 meet the door header 36.

Door unit 30 of the present invention includes the addition of a peripheral pocket 50 which lies behind the front and rear panels 38 and 40 of door jambs 32 and 34 and door header 36. Pocket 50 is also continuous extending all the way around the three sides of door unit 30. Pocket 50 is formed by an L-shaped molding or flange 52 having an interior base wall 54 which extends perpendicularly relative to the panels 38 or 40 and is recessed or inset inwardly relative to the exterior edge of the panels. In addition, flange 52 includes an outwardly extending side wall 56 which is parallel to the front and rear panels but extends slightly out past the peripheral edge of the front and rear panels. The side wall 56 is spaced away from the backside of the front and rear panels by a distance which is approximately equal to the thickness of a sheet of wallboard 60. Thus, pocket 50 is formed by the side wall 56 and base wall 54 such that a piece of wallboard may be inserted into pocket 50 behind the front and rear panel 38 or 40 until the edge of the wallboard engages against the base wall 54. This happens around all three sides of the door unit 30, i.e. around side jambs 32 and 34 and door header 36.

Door unit 30 of the present invention is advantageous because it can be used in constructing a wall assembly without having to use the wall studs that are normally located directly on each side of the door unit 30 and are screwed to the door jambs. In the usual construction, these wall studs are required to support each side of the door unit and have to be carefully placed in the wall assembly and then directly screwed or connected to the door jambs using many fasteners. This entails a fair amount of labor and extra fasteners.

However, in using door unit 30 of this invention, all that is required is for the bottom support channel 4 to be cut away in a position to allow the door unit 30 to be placed into the cut away portion of bottom support channel 4. The door unit 30 would still include the normal bottom attachment flange 62 at the bottom of each side jamb which attachment flange 62 would still be screwed into the floor of the building using fasteners 64. However, now the door unit 30 has an outwardly extending pocket 50 formed in back of the front and rear panels 38 and 40 on all three sides of the door unit 30 which pocket 50 is shaped to directly receive wallboard 60. Wallboard 60 may be directly inserted into this pocket by sliding the edges of the wallboard into pocket 50 until the very edge of the wallboard engages the interior base wall 54 of pocket 50 and the rear face of the wallboard is engaged with the front face of side wall 56. Then, using the normal types of fasteners 66 that are used to secure or attach wallboard, the installer will simply screw the wallboard to the door unit 30 by inserting fasteners 66 through the wallboard and through the side walls 56 of pockets 50 as shown in FIG. 3.

The flange 52 which forms pocket 50 can be attached to the backside of the front and rear panels 38 and 40 in any suitable manner. For example, the flange 52 could be welded thereto. However, flange 52 preferably includes an attachment wall 58 at the inner end of base wall 54 which attachment wall 58 can be abutted against the rear face of the front and rear panels. Attachment wall 58 can be secured to the front and rear panels in any suitable manner, e.g. using fasteners, or by spot welding the attachment wall to the panels.

Preferably, the side wall 56 of flange 52, i.e. the surface of the flange against which the wallboard is supported and through which the fastener 66 passes, is knurled or roughed over its face as illustrated generally at 70 by forming small bumps or ridges thereon. See FIG. 5. This would prevent the wallboard fastener 66 from skittering when the wallboard is fastened to flange 52. However, the flange side wall 56 could be used without the knurling 70 if so desired.

A door unit 30 as just described is a considerable improvement over prior art door frames. The wallboard 60 is used to rigidify and support the door unit 30 when it is secured thereto and will be sufficient to do so even without using the normal side studs usually placed on each side of the door unit. However, the door unit 30 could be further modified to also cooperate with short pieces of the improved wall studs 6 disclosed herein. These wall studs could extend downwardly from the upper support channel 4 to further support and rigidify the unit 30.

As shown in FIG. 3, each flange 52 used at the top header 36 of the door, i.e. the flanges 52 located at the top of the door unit 30 only and not at the side jambs, is provided with a set of ratchet teeth 20 which extend inwardly from the upper edges of the side walls 56 of the flange 52. See FIG. 3. These ratchet teeth are shaped identically to ratchet teeth 20 on side walls 10 of support channel 4. In effect, the flanges 52 used on top header 36 are similar to the spaced side walls 16 of channel 4 such that the top header 36 itself becomes a support channel. Thus, the improved wall studs 6 of the present invention can be installed in the door unit between the side walls 56 of flanges 52 used on top header 36 in a manner identical to the engagement of wall studs 6 in the usual channel 4. In other words, wall stud 6 is simply canted or twisted into the top of the door unit between the inwardly extending ratchet teeth 20 and then straightened out to engage the splines 24 on stud 6 with ratchet teeth 20. See FIG. 3.

As shown in FIG. 1, any number of studs 6 can be used to extend downwardly from the upper support channel to the top of the door unit. This could include some end studs 6e which extend down into the recessed cross-section of the side jambs 32 and 34, but these studs could terminate well above the floor and not extend the whole length of the door unit. If desired, that portion of the end studs 6e which are received within the cross-sectional configuration of side jambs 32 and 34 could be attached thereto using a couple of fasteners for extra rigidity. However, this is not required and not many fasteners have to be used due to the short length of end stubs 6e.

Various modifications of this invention will be apparent to those skilled in the art. For example, door unit 30 could be used in wall assemblies not using the improved channels 4 or studs 6 disclosed herein, in which case the ratchet teeth 20 could not have to be provided on the flanges 52 used in top header 36. The peripheral pockets 50 formed by flanges 52 have applications in all types of wall assemblies and effectively do away with the need for side studs to rigidity the sides of the door unit. However, it is preferred that door unit 30 include ratchet teeth 20 as shown in FIG. 3 and accept downwardly extending studs 6 which pass down from the upper support channel 4 of wall assembly 2.

Accordingly, the scope of the present invention is to be limited only by the appended claims.

I claim:

1. A door unit for use on a job site in a wall assembly built from a wall frame made from a plurality of vertically oriented, spaced wall studs which extend between and are secured to longitudinally aligned top and bottom support members, wherein wallboard is attached to at least one side of the studs for covering the studs and forming the wall, which comprises:

a prefabricated door frame which includes two, spaced side jambs connected at their top ends by a top header which spans the distance between the side jambs, wherein the side jambs and top header are assembled together in prefabricated form prior to their use at the job site such that the user of the door frame need not connect the side jambs and top header together at the job site to use the door frame in the wall assembly, the side jambs and top header having a generally similar cross-sectional configuration which includes a front panel on a front side of the door frame and a rear panel on a rear side of the door frame, wherein the lower ends of the side jambs are shaped to abut flat against a planar floor surface located in a cut away or open portion of the bottom support members to allow the prefabricated door frame to be stood up in an opening provided therefor in the wall assembly, and wherein the door unit further includes a peripheral pocket along the length of each of the side jambs and the top header on both the front and rear panels of the door unit, wherein the pocket extends a relatively short distance in back of the front and rear panels on each of the side jambs and the top header, wherein the pocket is dimensioned to receive therein one edge of a piece of wallboard to allow the wallboard to be directly connected to the door frame of the door unit such that the wallboard further supports the door frame of the door unit.

2. A door unit as recited in claim 1, wherein the peripheral pocket is formed by an L-shaped flange which is fixedly secured to the back of the front and rear panels of the door frame, the flange comprising:
   (a) a base wall which is inset a short distance in back of an exterior edge of the panels and extends perpendicularly relative to the panels; and
   (b) a side wall which extends outwardly at right angles from one end of the base wall in a direction parallel to the panels to terminate in an outer edge which is located slightly exteriorly of the exterior edge of the panels,
   whereby the edge of the wallboard can be slipped between the side wall of the flange and the front and rear panels of the door unit until it engages against the base wall of the flange and is backed by a front face of the side wall of the flange, whereby the wallboard can be secured to the flange by fasteners inserted through the wallboard and into the side wall of the flange.

3. A door unit as recited in claim 2, further including an attachment wall on the flange located at the end of the base wall which is opposite to the one end to which the side wall is connected, wherein the attachment wall extends perpendicularly relative to the base wall to allow the attachment wall to be abutted against the back of the panels for fastening the attachment wall of the flange to the back of the panels.

4. A door unit as recited in claim 2, wherein the front face of the side wall of the flange is knurled or roughened to prevent the fasteners used to secure the wallboard to the side wall from sliding on the side wall during installation.

5. A door unit as recited in claim 4, further including at least one set of horizontal ratchet teeth formed on a rear face of the side wall of each flange used on the front and rear panels of the top header portion of the door unit, the ratchet teeth being shaped to cooperate with a vertical spline provided on each side of a wall stud to allow one end of the wall stud to extend downwardly into and between the flanges on the top header of the door unit and be retained thereby in a ratchet engagement.

6. A door unit as recited in claim 1, wherein the lower ends of the side jambs of the door frame include a horizontal, planar flange which is suited to abut against the floor surface in a mating face-to-face engagement, and further including fastener means for extending downwardly through the flange into the floor surface for securing the lower ends of the side jambs of the door frame to the floor surface.

7. A door unit for use in a wall assembly built from a wall frame made from a plurality of vertically oriented, spaced wall studs which extend between and are secured to longitudinally aligned top and bottom support members, wherein the wall studs and top and bottom support members have a generally rectangular cross-sectional shape which includes opposed side walls which are spaced apart by a generally constant predetermined depth, wherein the opposed side walls of the wall studs and the opposed side walls of the support members extend in generally common planes on each side thereof to define two opposed sides for the wall frame against which wallboard can be abutted and secured, and wherein wallboard is attached to at least one side of the wall frame defined by the studs and top and bottom support members for covering the studs and forming the wall, which comprises:
   a door frame which includes two, spaced side jambs connected at their top ends by a top header which spans the distance between the side jambs, the side jambs and top header having a generally similar cross-sectional configuration which includes a front panel on a front side of the door frame and a rear panel on a rear side of the door frame, wherein the cross-sectional configuration of the side jambs and top header has a depth which is greater than the depth of the studs and top and bottom support members such that the front and rear panels are spaced in front of the opposed side walls of the studs and top and bottom support members, and wherein the lower ends of the side jambs are shaped to abut flat against a planar floor surface located in a cut away or open portion of the bottom support members to allow the door frame to be stood up in an opening provided therefor in the wall assembly, and wherein the door unit further includes a peripheral pocket along the length of each of the side jambs and the top header on both the front and rear panels of the door unit, wherein the pocket extends a relatively short distance in back of the front and rear panels on each of the side jambs and the top header, wherein the pocket is dimensioned to receive therein one edge of a piece of wallboard that is secured to the opposed side walls of the studs and top and bottom support members to allow such wallboard to be directly connected to the door frame of the door unit to help support to the door unit.

8. A door unit as recited in claim 7, wherein the lower ends of the side jambs of the door frame include a horizontal, planar flange which is suited to abut against the floor surface in a mating face-to-face engagement, and further including fastener means for extending downwardly through the flange into the floor surface for securing the lower ends of the side jambs of the door frame to the floor surface.

9. A door unit as recited in claim 7, wherein the door frame is prefabricated with the side jambs and top header preassembled together in prefabricated form prior to their use at a job site such that the user of the door frame need not connect the side jambs and top header together at the job site to use the door frame in the wall assembly.

10. A door unit for use in a wall assembly built from a wall frame made from a plurality of vertically oriented, spaced wall studs which extend between and are secured to longitudinally aligned top and bottom support members, wherein wallboard is attached to at least one side of the studs for covering the studs and forming the wall, which comprises:

a door frame which includes two, spaced side jambs connected at their top ends by a top header which spans the distance between the side jambs, the side jambs and top header having a generally similar cross-sectional configuration which includes a front panel on a front side of the door frame and a rear panel on a rear side of the door frame, and wherein the door unit further includes a peripheral pocket along the length of each of the side jambs and the top header on both the front and rear panels of the door unit, wherein the pocket extends a relatively short distance in back of the front and rear panels on each of the side jambs and the top header, wherein the pocket is dimensioned to receive therein one edge of a piece of wallboard to allow the wallboard to be directly connected to the door unit, and further including a set of horizontal ratchet teeth formed on a rear face of each pocket contained on the top header portion of the door unit, the ratchet teeth having a sawtooth configuration formed by a plurality of adjacent teeth along the rear face of the pocket contained on the top header portion of the door unit with the teeth in each set thereof extending inwardly relative to each other, the sawtooth configuration being shaped to cooperate with a vertical spline provided on each side of a wall stud to allow one end of the wall stud to extend downwardly into and between the two pockets contained on the front and rear panels of the top header of the door unit to be retained thereby in a ratchet engagement.

* * * * *